(12) United States Patent
Chong, Jr.

(10) Patent No.: US 6,397,267 B1
(45) Date of Patent: May 28, 2002

(54) REDIRECTED I/O FOR SCALABLE PERFORMANCE STORAGE ARCHITECTURE

(75) Inventor: Fay Chong, Jr., Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/261,978

(22) Filed: Mar. 4, 1999

(51) Int. Cl.[7] .................................................. G06F 3/00
(52) U.S. Cl. ............................ 710/1; 710/20; 710/131; 709/213; 711/100
(58) Field of Search ................................ 710/1, 12, 19, 710/31, 34, 131, 112, 13, 20, 52, 33; 711/100, 112, 4, 111; 709/213, 212

(56) References Cited

U.S. PATENT DOCUMENTS

| | | | | |
|---|---|---|---|---|
| 4,151,593 A | * | 4/1979 | Jenkins et al. | 364/200 |
| 4,603,416 A | | 7/1986 | Servel et al. | |
| 5,113,500 A | * | 5/1992 | Talbott et al. | 395/325 |
| 5,148,432 A | | 9/1992 | Gordon et al. | |
| 5,206,943 A | | 4/1993 | Callison et al. | |
| 5,448,709 A | | 9/1995 | Chandler et al. | |
| 5,487,160 A | | 1/1996 | Bemis | |
| 5,526,497 A | | 6/1996 | Zilka et al. | |
| 5,664,145 A | * | 9/1997 | Apperley et al. | 711/117 |
| 5,668,956 A | * | 9/1997 | Okazawa et al. | 710/126 |
| 5,720,028 A | * | 2/1998 | Matsumoto et al. | 714/9 |
| 5,724,539 A | * | 3/1998 | Riggle et al. | 711/100 |
| 5,793,763 A | | 8/1998 | Mayes et al. | |
| 5,832,205 A | * | 11/1998 | Kelly et al. | 714/52 |
| 5,860,080 A | * | 1/1999 | James et al. | 711/4 |
| 5,867,733 A | * | 2/1999 | Meyer | 710/74 |

(List continued on next page.)

OTHER PUBLICATIONS

AC&NC Raid Technology, Raid Level: 0 1 2 3 4 5 6 7 10 53, http://www.acnc.com/raid.html, Dec. 17, 1998, (11 pages).

Fibre Channel Overview, http://www.cern.ch/HIS/fcs/spec/overview.html, Jan. 11, 1999, (9 pages).

*Primary Examiner*—Jeffrey Gaffin
*Assistant Examiner*—Rijue Mai
(74) *Attorney, Agent, or Firm*—Conley, Rose & Tayon, PC; Robert C. Kowert

(57) ABSTRACT

A system and a method to transfer data between a host computer and a storage device. The storage controller architecture is organized into its functional modules based on whether a module primarily performs a control function or a data transfer function. The data paths that connect various functional units (for example, switching unit, parity logic, memory module, etc.) may then be sized to the required bandwidth. This effectively makes the iops (I/O operations per second) and bandwidth capability of a storage controller scalable independently of each other. A data transfer command from a host computer is decoded and translated into one or more data transfer commands by the control module in the storage controller. The control module then sends a list of translated commands to the host. Parity calculation, caching, one or more RAID levels and other relevant data transfer information may also be included as part of the translated set of commands. The host directly transmits the data transfer commands received from the control module to appropriate storage devices in the system. This allows for a direct transfer of data between the host and one or more storage devices without any need to route the data via the control module. The messaging scheme may be conveniently employed in a situation involving a two-party interface protocol (e.g., the fibre channel protocol) without modifying the standard architecture of the corresponding controller switch.

33 Claims, 12 Drawing Sheets

U.S. PATENT DOCUMENTS

| | | |
|---|---|---|
| 5,870,521 A | 2/1999 | Shinoda |
| 5,896,492 A | 4/1999 | Chong, Jr. |
| 5,913,057 A | 6/1999 | Labatte et al. |
| 6,023,754 A | 2/2000 | DuLac et al. |
| 6,065,096 A | 5/2000 | Day et al. |
| 6,085,285 A * | 7/2000 | Lucas et al. ................. 711/112 |
| 6,101,565 A | 8/2000 | Nishtala et al. |
| 6,115,394 A | 9/2000 | Balachandran et al. |
| 6,134,627 A | 10/2000 | Bak |
| 6,161,208 A * | 12/2000 | Dutton et al. ................ 714/764 |
| 6,167,424 A | 12/2000 | Bak et al. |

* cited by examiner

REDIRECTED I/O FOR SCALABLE PERFORMANCE STORAGE ARCHITECTURE

BACKGROUND OF THE INVENTION

1. Field of the Invention

This invention broadly relates to storage systems having at least one controller that manages data transfers between a host computer system and one or more storage devices. In particular, the present invention relates to a storage system having data transfer bandwidth independently scalable of I/O operation execution rate.

2. Description of the Related Art

Auxiliary storage devices, such as magnetic or optical disk arrays, are usually preferred for high-volume data storage. Many modern computer applications, such as high resolution video or graphic displays involving on-demand video servers, may heavily depend on the capacity of the host computer to perform in a data-intensive environment. In other words, necessity for external storage of data in relatively slower auxiliary data storage devices demands that the host computer system accomplish requisite data transfers at a rate that does not severely restrict the utility of the application that necessitated high-volume data transfers. Due to the speed differential between a host processor and an external storage device, a storage controller is almost invariably employed to manage data transfers to/from the host from/to the storage device.

The purpose of a storage controller is to manage the storage for the host processor, leaving the higher speed host processor to perform other tasks during the time the storage controller accomplishes the requested data transfer to/from the external storage. The host generally performs simple data operations such as data reads and data writes. It is the duty of the storage controller to manage storage redundancy, hardware failure recovery, and volume organization for the data in the auxiliary storage. RAID (Redundant Array of Independent Disks) algorithms are often used to manage data storage among a number of disk drives.

FIG. 1 shows a computer system 10 having a conventional storage controller 14 linking the host computer 12 with the external auxiliary storage device 16. The storage device 16 may include more than one disk drives and may also employ different RAID levels to store the data received from the host 12. The connecting links 13 and 15 may employ fibre channels, SCSI (Small Computer System Interface) interface, FC-AL (Fibre Channel Arbitrated Loop) interface, HIPPI (High Performance Parallel Interface) interface, USB (Universal Serial Bus) interface, ATM (Asynchronous Transfer Mode) interface, FireWire (High Performance Serial Bus) interface, an SSA (Serial Storage Architecture) interface or any other suitable interface standard for I/O data transfers.

As shown in FIG. 1, the conventional storage controller 14 receives every command, status and data packet during the host-requested data transfer. In other words, every binary information packet passes through the controller 14. An exemplary flow of packets during a data read operation through the conventional storage controller 14 is illustrated in FIG. 2. The data transfer protocol in FIG. 2 is typically a two-party point-to-point communication protocol, e.g. fibre channel protocol. The links 13 and 15 have been assumed to be fibre channels. However, the discussion of the general flow of packets depicted in FIG. 1 holds true for other interfaces as well.

Referring now to FIGS. 1 and 2 together, a read command identifying the storage controller 14 as its recipient (XID=A) is issued from the host 12 to the storage controller 14 over the link 13. The storage controller 14 performs necessary command translation and transmits another command packet to the storage device 16 over the link 15. The command packet from the controller 14 identifies the storage device 15 as its intended recipient (XID=B) and functions to instruct the storage device 16 to initiate the necessary data transfer, i.e. to transmit the host-requested data (as identified by the command from the controller 14). The storage drive or storage device 16 accesses the requested data and transmits data and status packets to the controller 14 over the interface link 15. The status packet may indicate to the controller 14 whether the read operation was successful, i.e. whether the data read was valid. The controller 14 then inserts its own ID (XID=A) into the received data and status packets and forwards those packets to the host 12. This completes the read operation initiated by the host 12. In the event that the status signals from the storage 16 indicate a faulty data read operation, the host 12 may reinitiate or abort the previous read transaction. In general, the packet transmission depicted in FIG. 2 is typical of a two-party point-to-point interface protocol, e.g. a fibre channel data transfer protocol.

Two parameters play a major role in measuring the performance of a storage system: (1) Input/Output (I/O) operations per second (iops), and (2) Data transfer rate. Generally, rate of execution of iops by a storage controller is governed by the type, speed and number of CPU's within the controller. However, the data transfer rate depends on the storage controller internal bandwidth that is dedicated for data transfer. Current storage systems have restricted scalability because of the storage controllers having a relatively inflexible ratio of CPU to bandwidth capability. In other words, as shown in FIGS. 1 and 2, the data transfer between the host and the storage is made dependent on the control functions (i.e., command and status packets) executed by the storage controller. This interdependence or interlocking of iops with the data transfer results in less efficient scalability of performance parameters. For example, in the conventional storage controller architectures, an increase in the data transfer bandwidth may unnecessarily, and sometimes quite expensively, require a similar increase in the number of CPU's residing within the controller.

Therefore, it is desirable to have a storage controller where control functionality (as measured by the iops parameter) is scalable independently of the data transfer bandwidth (which determines the data transfer rate), and vice versa. It may be further desirable to achieve independence in scalability without necessitating a change in the existing interface protocol managing the host-controller-storage interface.

SUMMARY OF THE INVENTION

The problems outlined above are in large part solved by a storage system as disclosed herein. The storage system includes a storage controller whose architecture is organized into functional units. The control function and the data transfer functions are separated so as to allow independent scalability of one or both. In other words, the storage system may be viewed as including a combination of a control module and a data switch. The command and status information may go to/from the control module, but the data may be moved directly between the host and the storage via the data switch. Thus, the control module and, hence, control functions or iops are effectively separated from the physical data transfer path. This allows data paths to be sized to the required bandwidth independently of the rate of execution of control packets by the control module or of controller bandwidth. Similarly, the number of control modules may be chosen independently of the data transfer function to meet the iops requirement.

Broadly speaking, a computer system according to the present invention includes a storage controller coupled to the host computer and the storage device. The storage controller includes a switch that links the host computer with the storage device via a control path and a data path. In one embodiment, the control and the data paths may be at least partially physically separate from each other. The control module of the storage controller is coupled to the switch through the control path. Any data transfer command from the host computer is transmitted over the control path, and, hence, passes through the control module. However, data transferred to/from the storage device is over the data path only. Therefore, the storage controller accomplishes selective scalability of data bandwidth because the data is not routed through the control module. Instead, the switch directly transfers data between the host and the storage based on the routing information supplied by the control module.

In one embodiment, the storage controller may include parity calculation logic to calculate and store parity information along with the data in the storage device. An even or an odd parity may be calculated. Other suitable error control logic, such as Error-Correcting Code (ECC) algorithms, may be employed. Parity calculation may depend on the RAID level selected by the control module. In a different embodiment, the control module may dynamically select one or more RAID levels for the data being written into the storage device. Alternatively, data may be stored among various disk drives in the storage device using a predetermined RAID level.

According to another embodiment, the storage controller includes a cache memory for read or write data caching. The cache memory may provide high-speed data storage, especially during small data transfers. Therefore, data transfer latencies may be minimized by providing such a high-speed stand-by storage through a cache memory.

The storage controller according to present invention may include a switch that allows independent scalability without any modifications or changes in the existing interface protocol. Thus, for example, the switch in the storage controller may implement necessary modifications in the data packets to comply with the existing interface data transfer protocol, e.g., the fibre channel data transfer protocol.

In an alternative embodiment, the interface protocol, e.g., the fibre channel protocol, may be implemented with a standard switch, but with a different messaging scheme. The present invention thus contemplates a computer system where the scalable storage controller is configured to operate with a standard controller switch. The control module may be configured to receive the data transfer command from the host via the standard switch. However, instead of translating the received command and forwarding it to the storage device, the control module may be configured to transmit the translated command or commands back to the host computer. The host computer may, in turn, retransmit this second set of commands provided by the control module directly to the storage device via the switch. Thus, the storage device receives commands directly from the host and responds directly to the host.

The message transfer scheme according to one embodiment may further include transmitting data transfer status information directly from the storage device to the host computer via the standard switch in the storage controller. The host computer, then, may send the transaction status to the control module, which, in turn, may respond with a final status packet to complete the data transfer cycle.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 3A:
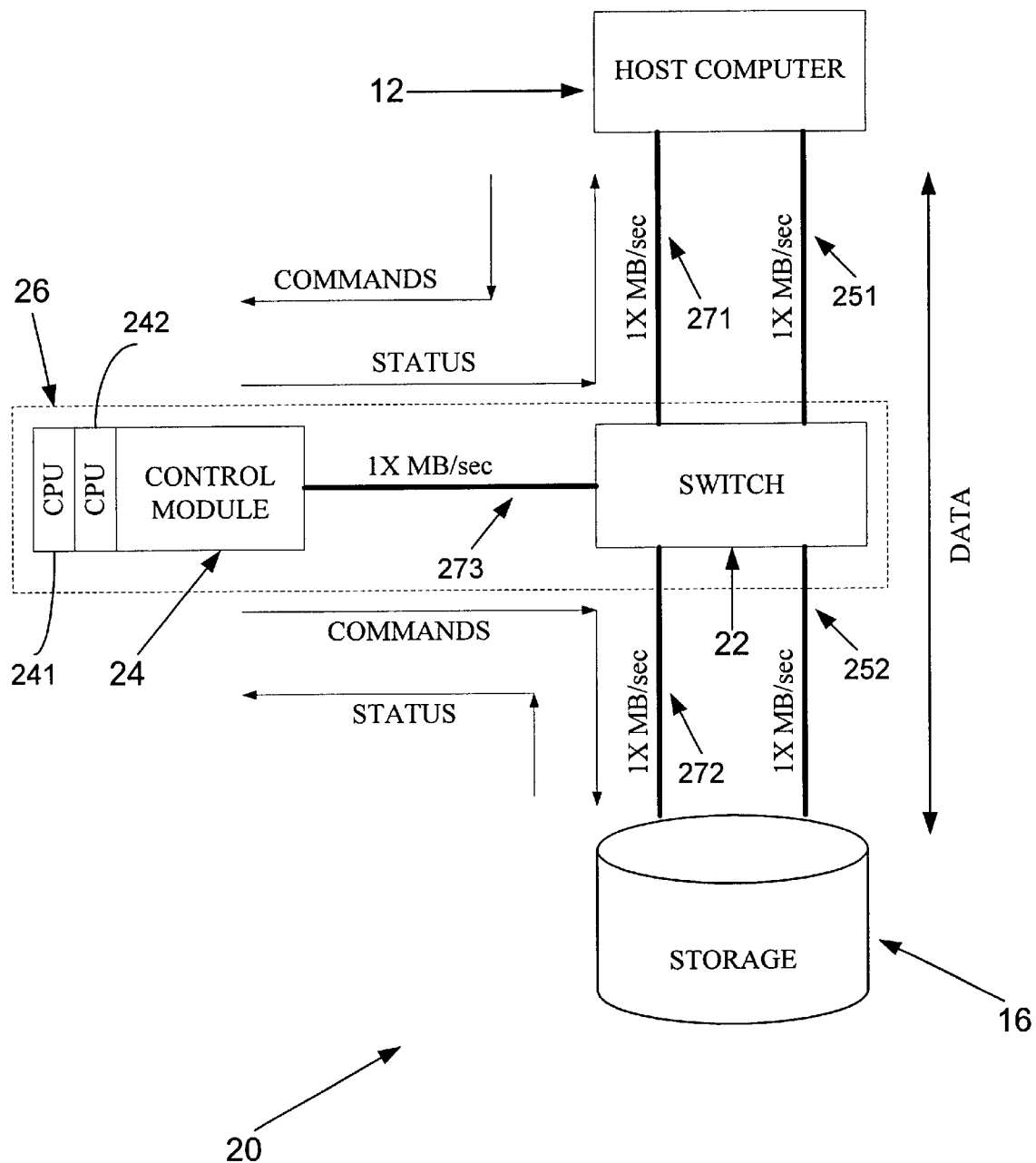
FIGS. 3A–3E show computer systems with different embodiments of the storage controller architecture according to the present invention. Separation of data and control paths is illustrated. Independent scalability of control and data transfer functions is also shown in detail.

Referring now to FIG. 3A, a computer system 20 implementing one embodiment of the storage controller 26 according to the present invention is shown. The storage controller 26 includes a control module 24 and a switch 22. The control information (including command and status signals) flows over a control path defined by the interconnecting links 271, 272 and 273. Whereas, the data flows directly between the host computer 12 and the storage device 16 through the switch 22 and over the data path defined by the interconnecting links 251 and 252. This is different from the conventional storage controller 14 (FIG. 1) where every command, status and data information is passed between the host and the storage controller as well as between the storage controller and the storage device.

The storage controller architecture is thus organized into its functional units. The control module receives data transfer commands (read or write commands) from the host computer 12 through the control path including the links 271 and 273. The control module 24 translates a data transfer command from the host 12 prior to transmitting the translated commands to the storage device 16 over the links 273 and 272. The control module 24 performs translation of the command received from the host 12 into one or more commands depending on the data transfer request (read or write request) specified by the command from the host. The storage controller 26 may store data into the storage 16 using one or more RAID (Redundant Array of Independent Disks) levels. In that case, the translated set of commands from the control module 24 may also include appropriate commands for the RAID level selected. The control module 24 may include one or more processors, 241 and/or 242, to perform various control functions (or iops), including the translation of the commands received from the host computer 12.

In general, the RAID level is determined when the storage volume is set up. At that time, the system software or the user may decide which RAID level to use. For example, mirroring under RAID 1 may be used. Alternatively, RAID 5 with parity calculation may be chosen. A combination of more than one RAID level (for example, RAID 0 and RAID 1) may also be implemented. In one embodiment, parts of the storage volume may be stored under different RAID levels or combination of RAID levels. The control module 24 may be provided with the necessary information for the RAID level selected for data storage. This information may then be utilized by the control module 24 when issuing appropriate commands during data write operations. In some embodiments, during a data read operation, there may be no choice of RAID level and any redundancy present in the data read may be ignored.

In one embodiment, the control module 24 dynamically selects one or more RAID levels (from the group of RAID levels identified when storage volume was set up) for the data to be written into the storage device 16. Depending on the write command received from the host 12 and depending on the prior storage history for specific types of writes from the host 12, the control module driving software may instruct the storage device 16 to divide the data to be stored into more than one block and each block of data may be stored according to a different RAID algorithm (for example, one data block may be stored according to RAID 1 whereas another data bock may be stored according to RAID 5) as indicated by the commands from the control module 24 to the storage 16. In an alternative embodiment, the control module 24 may simply instruct the storage 16 to store the data received from the host 12 using one fixed, predetermined RAID level (for example, all writes may be RAID 5 writes).

The storage device 16 may typically include more than one storage disk and the storage disks (not shown) may be organized into disk arrays in case of RAID-based storage architecture. The storage 16 may be one or more discrete physical devices, e.g., disk drives, tape drives, etc. Alternately, the storage 16 may be a storage subsystem with more than one disk drives and a resident RAID controller. Additionally, the storage device 16 may allow hot-swapping in the event of a disk failure. The storage disks may implement magnetic, optical or any other method of storing high-volume data. Some examples of storage disks include CD ROMs, magnetic tapes, video disks, etc. Protection from power failures may also be part of the storage device architecture. In one embodiment, the storage controller 26 may manage storage redundancy built into the storage device 16. The storage controller 26 may also be configured to manage data recovery in the event of a storage device hardware failure. The storage controller 26 may also issue appropriate recovery commands in the event of data volume rebuilding after the hardware failure. One or more RAID algorithms may also be used by the storage controller 26 (particularly, by the control module 24) to manage such data storage and recovery operations. In an alternative embodiment, the storage device 16 may include a resident RAID controller (not shown). In this configuration, the control module 24 may not need to perform RAID operations and may simply issue data transfer commands without specifying the RAID levels for data storage.

Figure 3B:
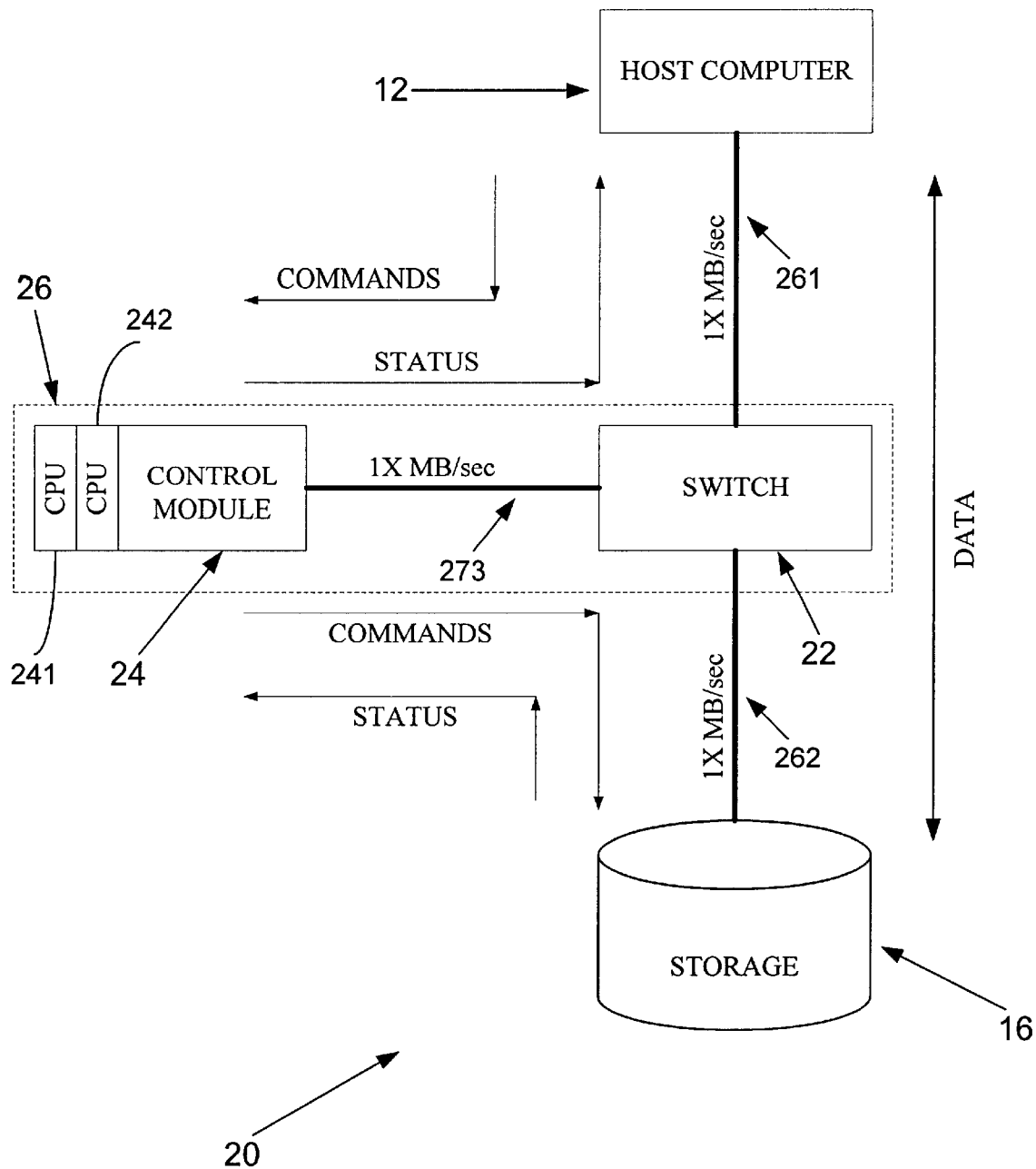

It is noted that the control path (which includes interconnect links 271, 272 and 273) and the data path (which includes interconnect links 251 and 252) may be physically separate. However, as command and status information requires relatively very small bandwidth as compared to the data transfer bandwidth, the computer system 20 may be designed where some conductors over the links 271, 251, 272 and 252 may share control and data information. In other words, the control and the data paths may be at least partially physically separate in an embodiment. Alternatively, the control and the data paths may be physically inseparable. One such embodiment is illustrated in FIG. 3B where the same physical links, 261 and 262, may carry control as well as data signals. The switch 22 may be configured not to pass data through the control module 24 so as to allow independent scalability of control and data functions. The link 273 between the control module 24 and the switch 22 may have less bandwidth than the links 261, 262 (FIG. 3B) or links 251, 252 (FIG. 3A) connecting the host 12, the switch 22 and the storage device 16.

Figure 3C:
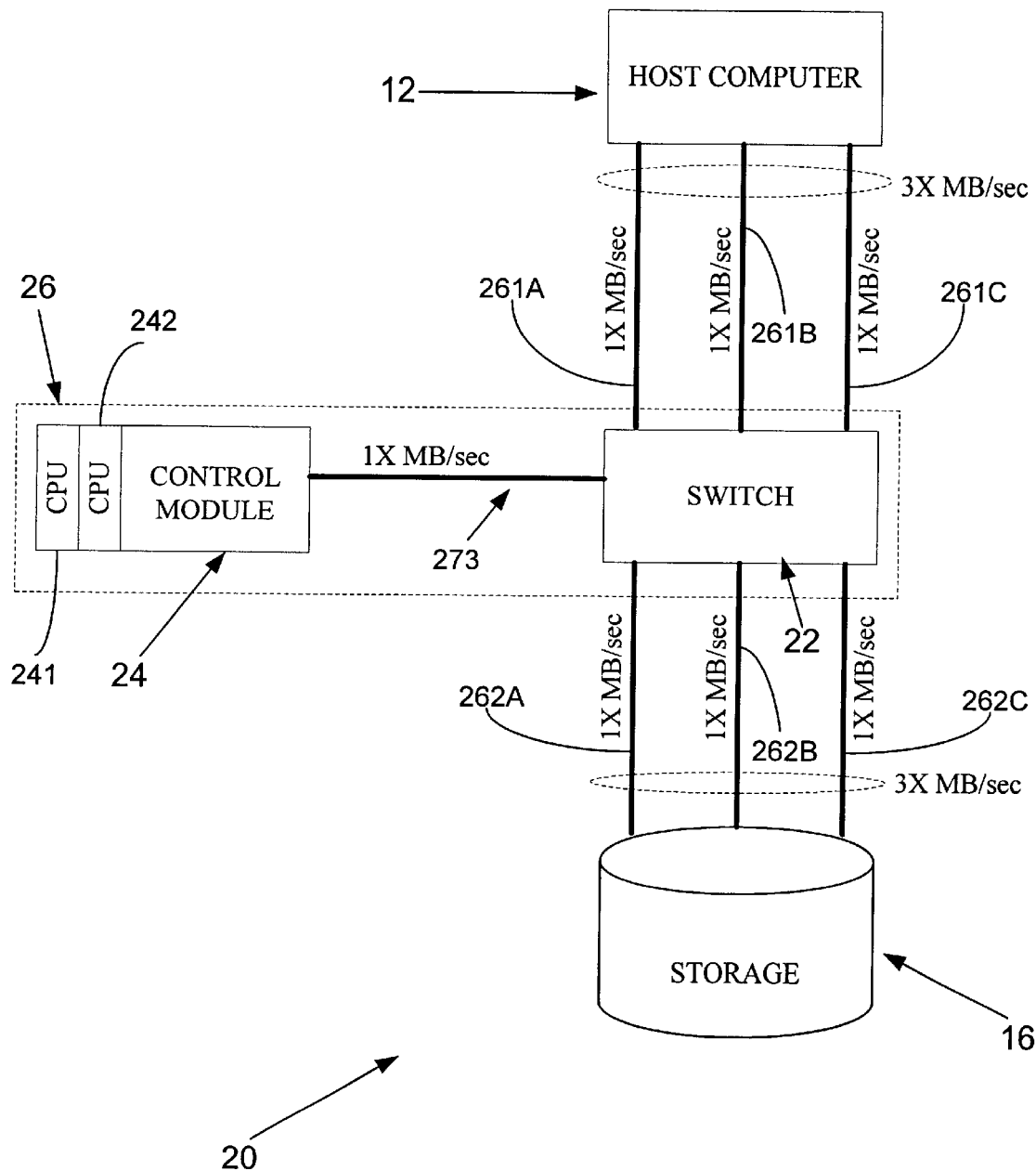

The storage controller architecture of the present invention improves scalability because of the independence of control and data functions performed by the storage controller 26. For example, when more controller bandwidth is desired, the bandwidth of the data handling components (i.e., the switch 22, the host 12 and the storage 16) as well as the bandwidth of the interconnect (for example, of the links 261 and 262) may be increased. FIG. 3C illustrates one such embodiment where the interconnect links 261 and 262 in the computer system 20 of FIG. 3B are replicated to have a set of six interconnect links, 261A–261C and 262A–262C. The total data transfer bandwidth is shown to be three times more than the control bandwidth. It is understood that the rate of digital information transfer is shown to be in MB/sec, but may be conveniently selected to be GB/sec or any other suitable rate as supported by the system architecture. Thus, selective scalability of data paths may be achieved without attendant costs of increasing rate of execution of I/O operations by the control module 24.

Figure 3D:
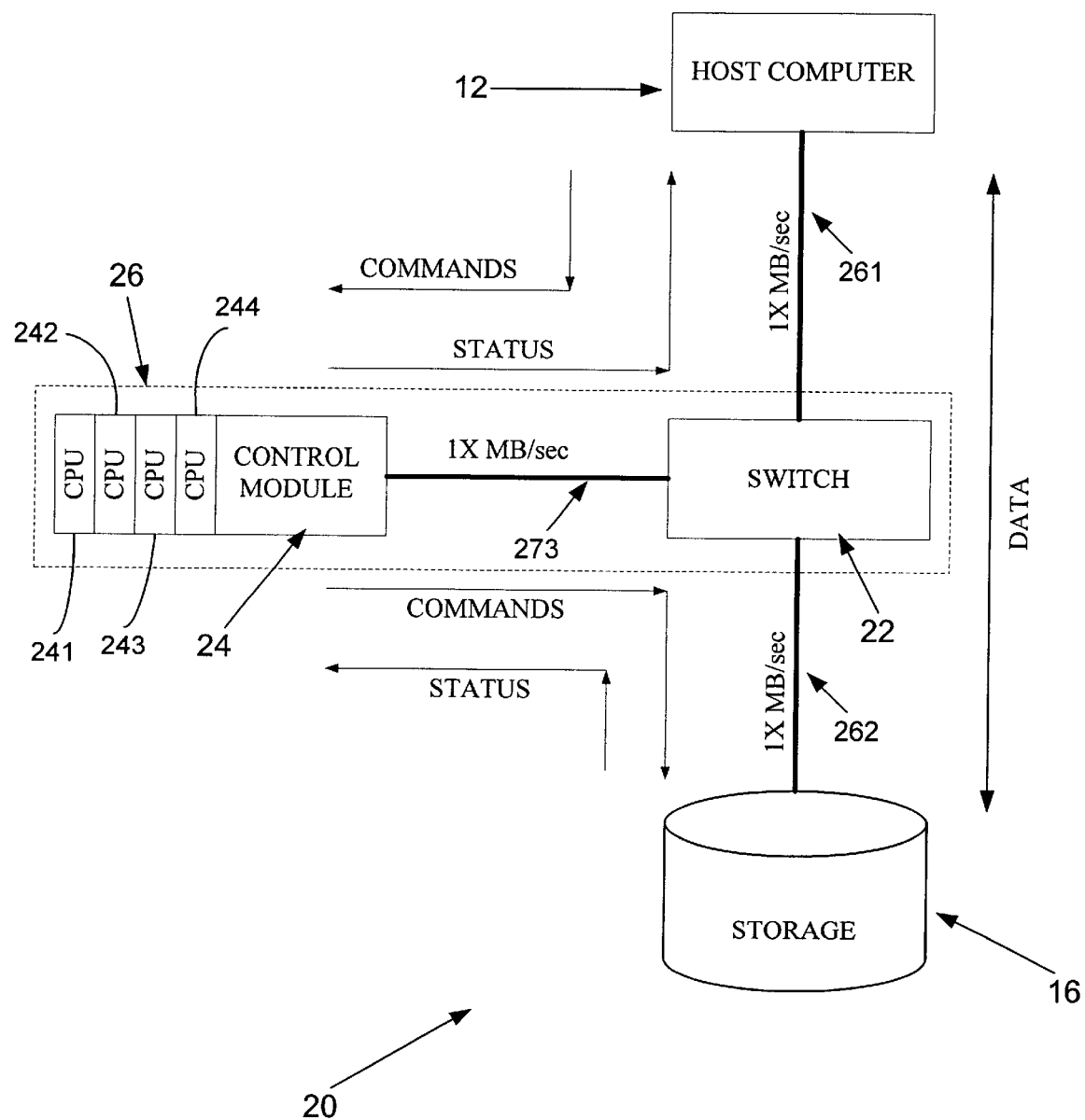
Figure 3E:
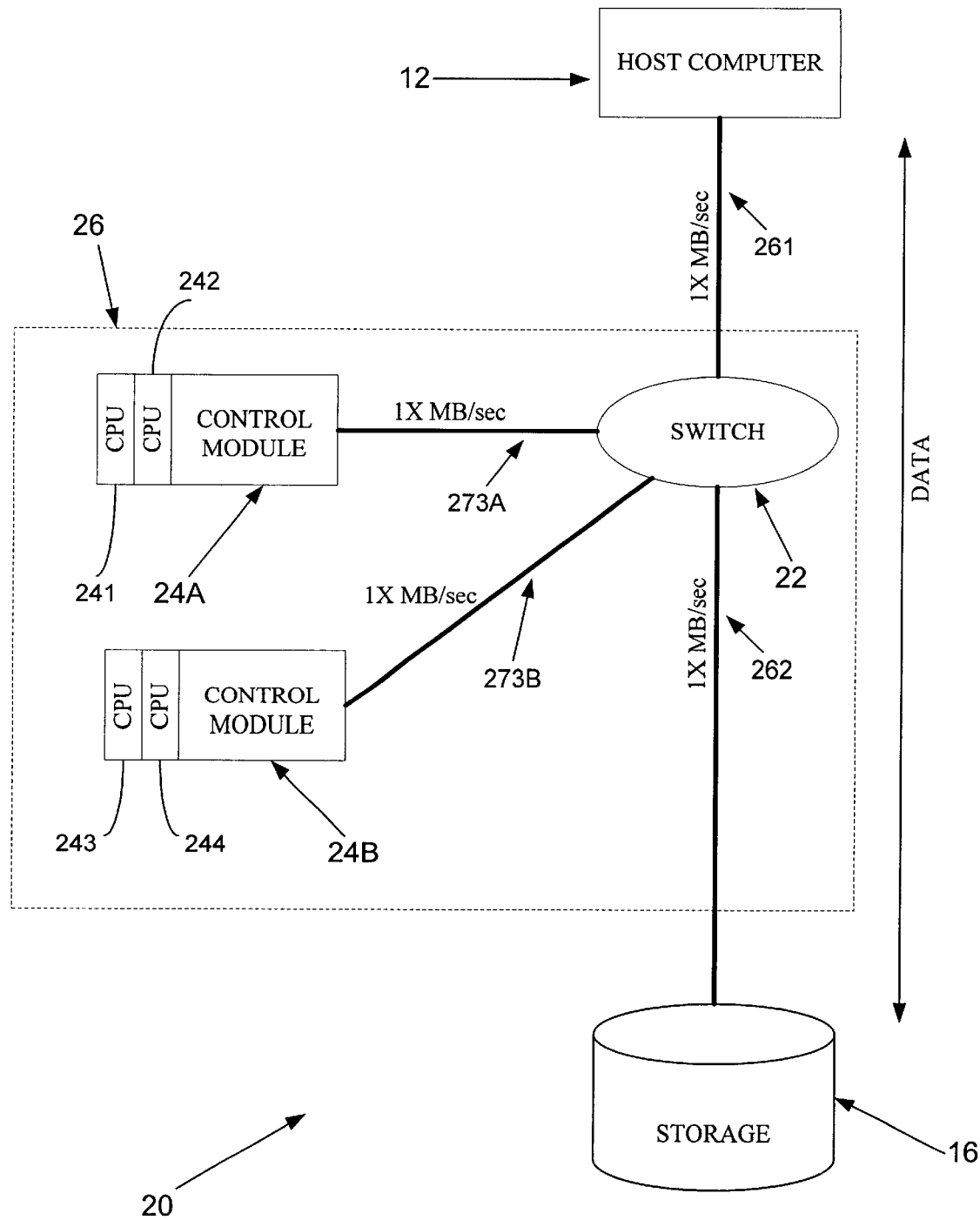

On the other hand, if more iops are required, more CPU's or processing units may be added to the control module 24. FIG. 3D shows one such embodiment where the storage controller 26 is modified to include four processors, 241–244, for increased iops. Alternatively, the storage controller 26 may add another control module to share the iops load. FIG. 3E shows a storage controller 26 having two control modules 24A, 24B connected to the switch 22 via two independent interconnect links 273A and 273B respectively. The storage controller 26 may thus be made expandable to include additional control modules when increased iops are desired. Some of the arrows indicating directions of flow of command, status and data signals have been omitted from FIGS. 3C and 3E for the sake of clarity only. Each of the FIGS. 3A–3E, therefore, illustrates how the data transfer functionality of a storage controller may be made independent of its control functionality.

Figure 4A:
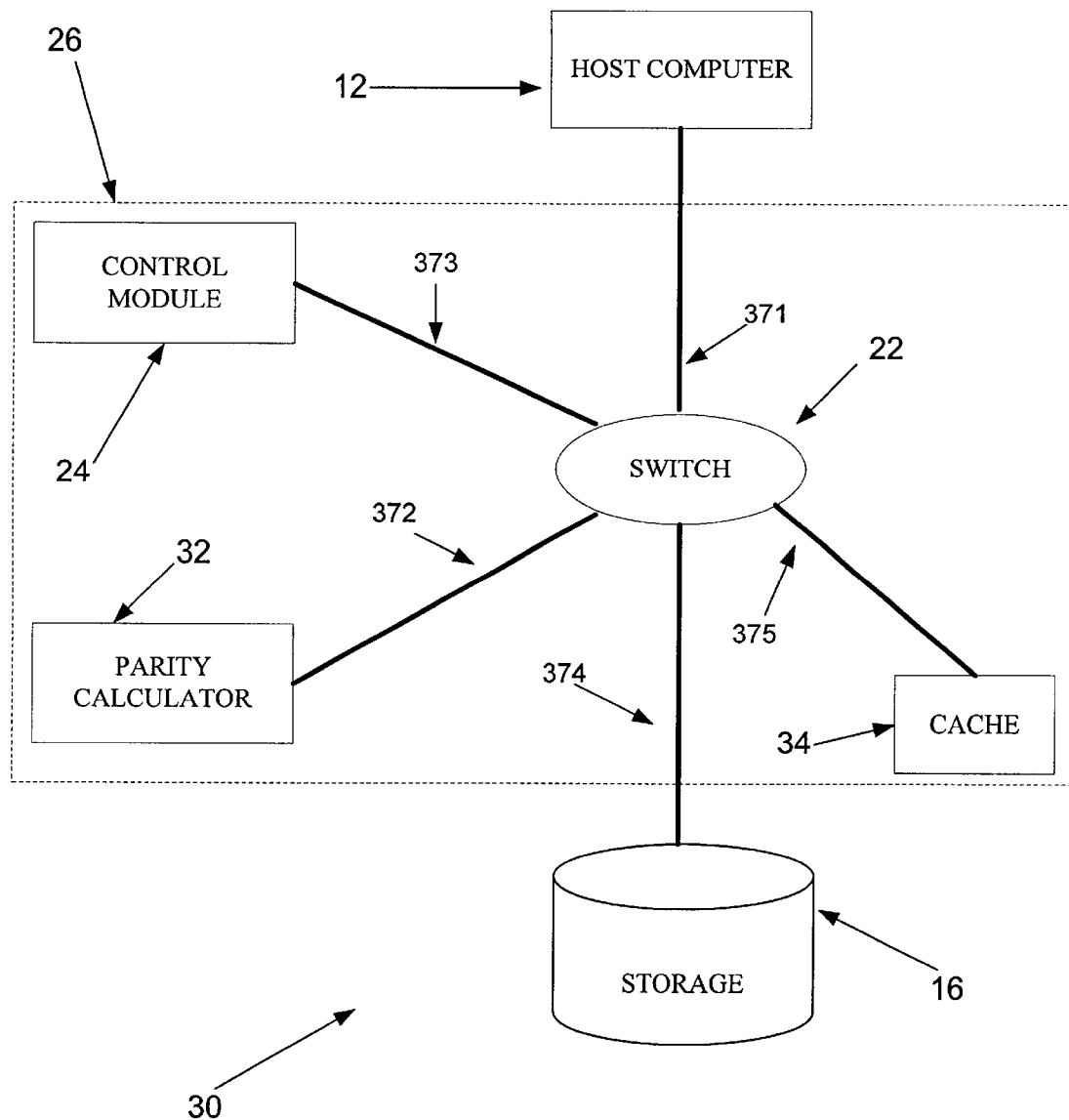
FIG. 4A depicts a computer system implementing another embodiment of the storage controller of the present invention.

Referring now to FIG. 4A, a computer system 30 with a different embodiment of the storage controller 26 according to the present invention is shown. The storage controller 26 is shown to include a parity calculator or parity logic 32 and a cache memory or memory module 34. In one embodiment, the parity module 32 is combined with the cache memory module 34 eliminating additional interconnect links. All the circuit elements are shown coupled to the switch 22 via respective links 371–375. The switch 22 is shown to have five ports to connect five system elements—the host 12, the control module 24, the parity logic 32, the storage device 16 and the cache memory 34. The switch may have additional ports as described later with reference to FIG. 5.

The memory module 34 primarily functions as a "short-term" storage for the data being transferred to/from the storage device 16. Generally, because of the higher speed of the cache memory 34, small volume of data may be transferred from the host 12 to the memory module 34 prior to finally storing the data into the storage 16. Alternately, data read from the storage 16 may also be "temporarily" stored in the cache memory 34 prior to finally transferring the data to the host computer 12 for further processing. The cache memory 34 preferably has persistence over power failure so as to preserve data integrity and to facilitate data recovery by the control module 24.

Generally, on write caching, the host 12 sends the transaction to the storage controller 26 and the control module 24 issues appropriate commands to the switch 22 to store the data into the cache memory module 34. The control module 24 also notifies the host computer 12 that the write operation is completed. If the host 12 wants to read that data, then the control module 24 allows retrieval of the data from the cache memory 34. The control module 24 schedules flushing of the cache data to the storage device 16 based on how recently the data has been accessed, space needed in the cache 34 for another data storage operation, etc. On read caching, the storage controller 26 causes the data requested by the host to be read from the storage device 16 and stored in the cache 34. The storage controller 26 may cause additional non-requested data to be stored in the cache 34 in anticipation of future read requests from the host 12. If the requested data is in the cache 34, then the host may receive it sooner than if the controller 26 has to access the storage device 16 to retrieve the requested data.

The memory module 34 may also include a cache controller (not shown) to manage the data transfers to/from the cache memory 34. The cache controller typically would receive one or more commands from the control module 24 and would accordingly prepare the data transfer to/from the cache memory 34. The cache controller may also initiate data transfer from the cache memory 34 by sending appropriate data write command to the control module 24, which, in turn, may prepare the storage device 16 to receive the data being offloaded from the cache 34. Similarly, data from the cache memory 34 may also be transmitted to the host computer 12 with the help of the control module 24. Some exemplary RAID-based data transfer operations are described later in conjunction with FIG. 4B. In an alternative embodiment, the cache controller or cache manager (not shown) may be a part of the control module 24. The cache manager in the control module may also perform the same cache management functionality as discussed here with reference to the embodiment of FIG. 4A.

The parity calculator module 32 calculates parity for the data being written into the storage device 16 to facilitate data error detection and correction during retrieval of stored data. The parity calculator preferably receives parity calculation commands from the control module 24 after the control module decodes the command sent from the host computer 12. In one embodiment, the parity calculator 32 computes even-parity. In an another embodiment, odd-parity may be calculated. In yet another embodiment, the parity calculator module 32 may employ any suitable error control logic, such as an Error-Correcting Code (ECC) algorithm. The parity logic 32 may determine the minimum size of data block for which parity may be calculated. Larger data blocks may be divided into separate data blocks for parity calculation purpose. The parity calculator 32 may include necessary storage or memory to temporarily save the data for which parity is being calculated. After parity calculation is complete, the parity calculator 32 may initiate transfer of parity information to the storage device 16. The storage device 16 may place the received parity information at appropriate storage locations depending on the storage algorithm, e.g., the RAID level, indicated by the control module 24 or, when applicable, by the resident RAID controller in the storage device.

As noted earlier, the control module 24 receives commands from the host computer 12, decodes and translates the received commands, and transmits one or more translated commands to the storage device 16. In implementing a data transfer operation, the control module 24 in the embodiment of FIG. 4A may also transmit a portion of translated commands to appropriate circuit elements including the parity logic 32 and the cache controller (not shown). Similarly, the control module 24 may receive status information signals from various circuit elements, e.g., cache controller, storage device etc. via the switch 22. Finally, the control module 24 may transfer the status information to the host computer 12 via switch 22 and over the control path (links 371 and 373).

The control module 24 may include one or more processors (CPUs) as shown in FIGS. 3A–3E to process the command and status information from various circuit elements. In the event that the storage device 16 comprises more than one disk drive, the control module 24 may also include a drive selection logic to instruct the storage device 16 regarding the drive to place the data in. The selection of drive may further depend on the data storage algorithm, such as a RAID algorithm, implemented by the storage controller 26. For example, read or write operations on RAID volumes may involve more than one physical drive (in case of multiple-drive storage). The control module 24 may therefore issue necessary data transfer commands to store or retrieve data from among a number of storage drives. The control module 24 further includes interface logic or interface port (not shown) to transmit and receive various command and status information via the switch 22.

As mentioned before, the interconnect links, 371 through 375, may include physically separate data and control paths or may have shared data and control lines. Further, the link interconnects may employ serial or parallel data transfer modes. Some examples of an interconnect architecture include a fibre channel, a parallel electrical bus, a USB bus, an ATM bus, a HIPPI interface, a SCSI bus, a FireWire bus, etc. The storage controller 26 may also be coupled to the host 12 and the storage 16 via a fibre channel loop interface (FC-AL) or a Serial Storage Architecture (SSA) interface. The arbitrated loop (FC-AL) may accomplish the same function as the switch when transferring information between any two nodes on the loop.

Figure 5:
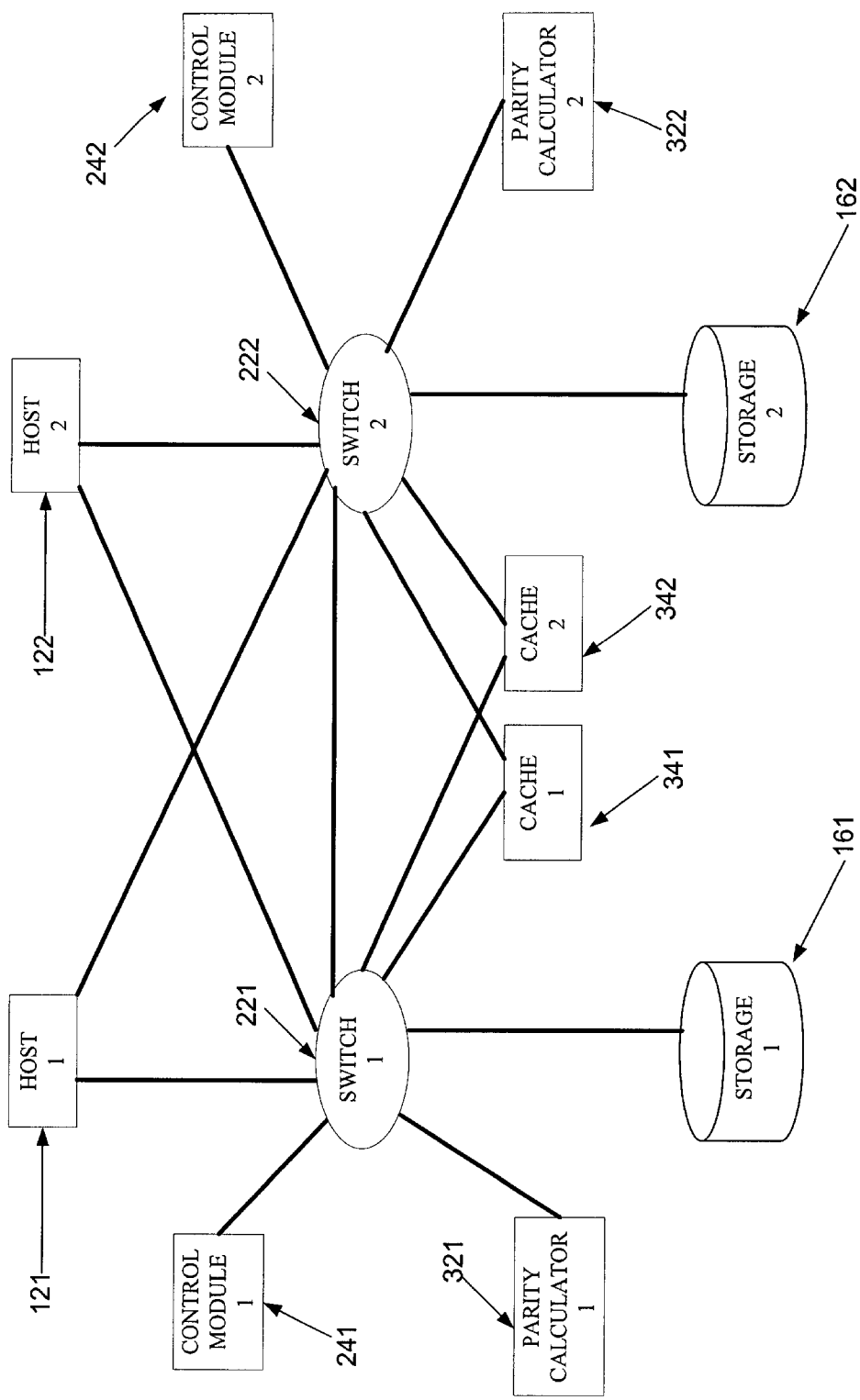
FIG. 5 illustrates an exemplary fault-tolerant configuration with scalable performance storage architecture.

The switch 22 in the storage controller 26 functions to route command, status and data information between two or more circuit elements. In one embodiment, the switch may have sufficient number of ports to allow two hosts to simultaneously access the switch for pertinent data transfer operations involving the storage device. One such implementation of such a multi-ported switch 221 is illustrated in FIG. 5. The switch 22 may be configured to send data to multiple places at the same time. This replication "on the fly" saves in latency and reduces bandwidth requirements. For example, typical multiple destinations during a data write operation may include the cache memory 341, the cache mirror 342, and the parity calculator 321 in the embodiment of FIG. 5.

The switch 22 may need to be configured depending on the interface standard (SCSI, SSA, fibre channel, ATM, etc.) for the interconnect links 371–375. Other remaining modules, i.e., the control module 24, the parity logic 32 and the cache memory 34, may be constructed from standard components. Similarly, host adapters (not shown) and one or more storage devices may be configured from readily available components.

In one embodiment, the host 12 to controller 26 and the controller 26 to storage device 16 links, 371 and 374 respectively, implement SCSI protocol over fibre channel. As is known in the art, a fibre channel port simply manages a point-to-point connection between itself and the fibre channel fabric (here, the switch 22). Fibre channel is a high performance serial link supporting its own, as well as other higher level protocols such as FDDI (Fibre Distributed Data Interface), SCSI, HIPPI, IPI (Intelligent Peripheral Interface), etc. Fibre channel typically provides control and complete error checking over the fibre channel link. A fibre channel link includes two unidirectional fibres transmitting in opposite directions with their associated transmitter and receiver. Each fibre is attached to a transmitter of a port at one end and a receiver of another port at the other end. A fibre channel may operate at a variety of speeds, for example, 133 Mbits/s, 266 Mbits/s, 1 Gbits/s, etc. Fibre channel transmission distances vary depending on the combination of fibre channel speed and the fibre media (electrical or optical).

Fibre channel has two parties: (1) An originator or an initiator port, and (2) A responder or a target port. The initiator sends the command to the target. The target decodes the command and data is transferred to or from the initiator depending on the command. After the completion of data transfer, the target sends status information to the initiator. The status information indicates the status (i.e., valid data transfer, error during data transfer, etc.) of the corresponding data transfer operation initiated by the initiator.

The scalable performance storage architecture (for example, FIGS. 3A–3E and 4A) may employ a three party exchange. The initiator (the host 12) sends commands to the target (the control module 24), but the data is transferred directly between the storage device 16 and the host 12. In case of a fibre channel interface standard, such a three-party operation may require the switch 22 to have added capabilities. One of the most important capabilities is to be able to redirect the fibre channel data as required by the fibre channel protocol. In one embodiment, additional hardware is added to the switch 22 to replace a destination field in a data packet received from the storage 16 with the node address of the host 12. This effectively converts storage device data packets into controller data packets as required by the fibre protocol for communication between the host 12 and the control module 24. A detailed explanation of data redirection over fibre channel may be found in the co-pending patent application, which is incorporated herein by reference in its entirety, titled "Apparatus and Method for Streamlining Data Transfer with Existing Interconnect Bandwidth", filed on Oct. 28, 1996 and having Ser. No. 08/742,602.

Figure 4B:
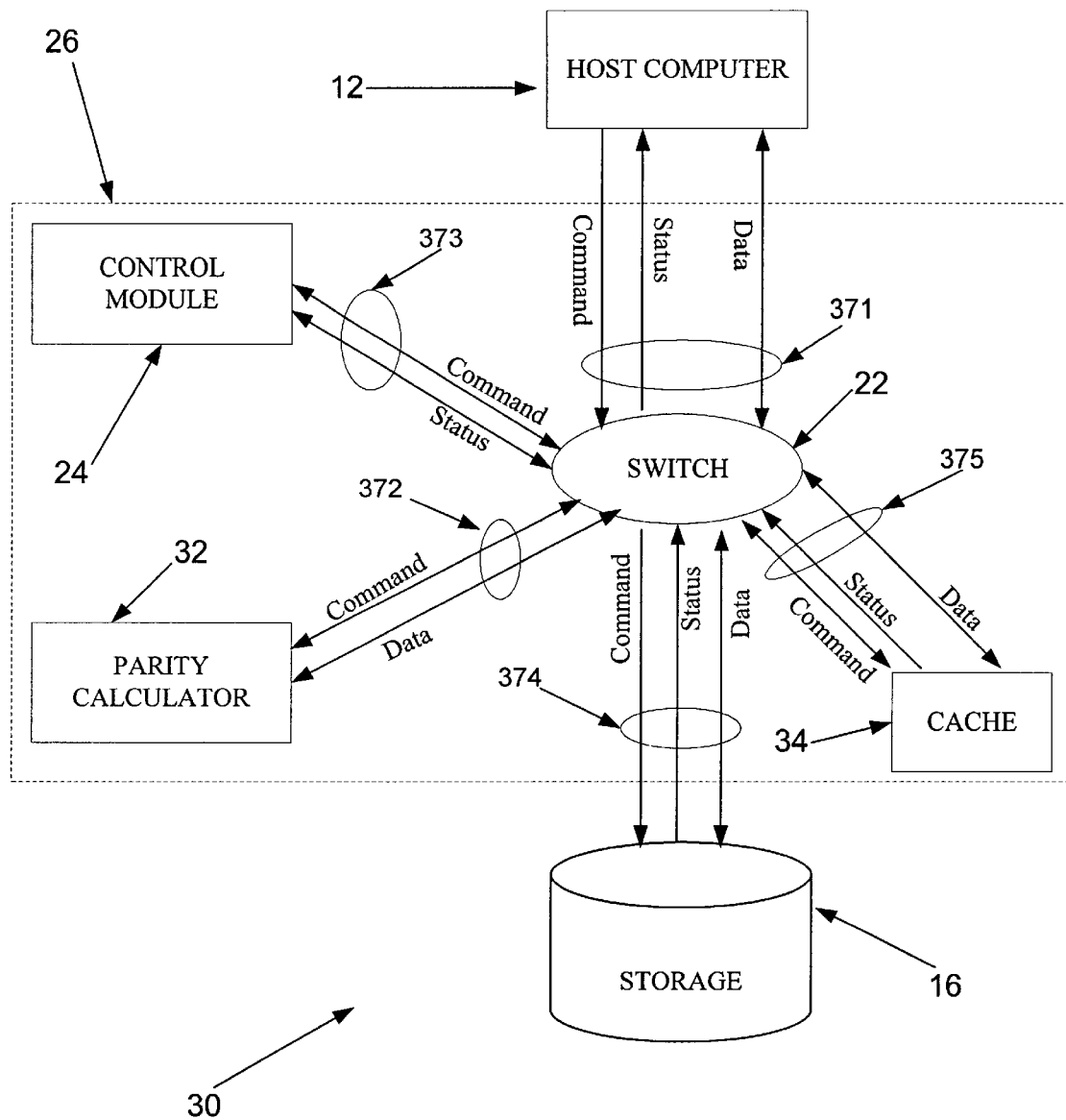
FIG. 4B shows an exemplary flow of command, status and data packets for the computer system in FIG. 4A.

Referring now to FIG. 4B, an exemplary flow of command, status and data packets for the computer system 30 in FIG. 4A is shown. As mentioned before, the interconnect links may have physically separate data and control paths or may have shared electrical or optical conductors for data and control paths. As described earlier, the separation of data transfer and control functions may essentially be implemented in any given interconnect protocol regardless of whether the protocol employs packetized information transfer or not.

FIG. 4B shows internal flow of data and control packets over the links 371–375 for an embodiment where the interconnect links 371–375 are SCSI over fibre channels, and the switch 22 is modified to manage direct data transfer from the storage 16 to the host 12 as previously described. It is noted, however, that the flow of data and control packets as generally depicted in FIG. 4B may be implemented in any suitable interface protocol in addition to the fibre channel protocol, with or without minor modifications. Further, the following sample read and write operations are described with reference to various RAID levels. However, it is evident that any data storage management algorithm may be employed along with the scalable performance storage architecture in, for example, FIGS. 3A–3E and 4B to accomplish fault tolerance and reliable data storage.

The following examples illustrate sequence of operations executed by the scalable storage controller 26 in routing the command, status and data packets in the computer system 30 of FIG. 4A or 4B. It is noted that all information transfers between two modules are routed via the switch 22.

(1) RAID 1 or RAID 5 Read Operation (Storage to Host):
   (i) Read command is sent by the host to the control module.
   (ii) Control module determines which drives in the storage are involved.
   (iii) Control module issues routing information to the switch.
   (iv) Control module issues one or more read commands to drives in the storage.
   (v) One or more data units are transferred from drives through switch to host.
   (vi) Ending status from drives sent to the control module.
   (vii) Ending status sent from the control module to the host.

(2) RAID 1 or RAID 5 Read Operation (Cache to Host):
   (i) Read command is sent by the host to the control module.
   (ii) Control module issues routing information to the switch.
   (iii) Control module issues read command to the cache.
   (iv) One or more data units are transferred from the cache through the switch to the host.
   (v) Ending status from the cache is sent to the control module.
   (vi) Ending status is sent from the control module to the host.

(3) RAID 1 or RAID 5 Write Operation (Host to Cache):
   (i) Write command is sent by the host to the control module.
   (ii) Control module issues routing information to the switch.
   (iii) Control module issues transfer ready status to the host.
   (iv) Data is transferred from the host to the cache via the switch. In a fault-tolerant configuration (e.g., FIG. 5), the data may also be simultaneously transferred to any other cache in the system via the same switch, i.e. the switch 22.
   (v) Ending status from the cache 34 (or, from the caches 341, 342 for the configuration in FIG. 5) is sent to the control module.
   (vi) Ending status sent from the control module to the host.

(4) RAID 5 Write Operation (Cache to Storage):
- (i) Write command initiated by controller cache manager.
- (ii) Control module determines which drives in the storage are involved.
- (iii) Control module issues routing information to the switch.
- (iv) Control module issues commands to the cache and to the parity calculator.
- (v) Data transferred from the cache through the switch to drives and to the parity calculator.
- (vi) Parity information transferred from the parity calculator to one or more drives through the switch.
- (vii) Ending status sent from the drives to the control module.

(5) RAID 5 Write Operation (Host to Storage):
- (i) Write command is sent by the host to the control module.
- (ii) Control module determines which drives in the storage are involved.
- (iii) Control module issues routing information to the switch.
- (iv) Control module issues command information to the parity calculator.
- (v) Control module issues transfer ready status to the host.
- (vi) Data transferred from the host to the parity calculator and to the drives via the switch.
- (vii) Parity information transferred from the parity calculator to one or more drives through the switch.
- (viii) Ending status sent from the drives to the control module.
- (ix) Ending status sent from the control module to the host.

(6) RAID 1 Write Operation (Cache to Storage):
- (i) Write command initiated by controller cache manager.
- (ii) Control module issues routing information to the switch.
- (iii) Control module issues commands to the cache controller.
- (iv) Data transferred from cache through switch to the drives (primary and mirror).
- (v) Ending status sent from the drives to the control module.

(7) RAID 1 Write Operation (Host to Storage):
- (i) Write command is sent by the host to the control module.
- (ii) Control module determines which drives in the storage are involved.
- (iii) Control module issues routing information to the switch.
- (iv) Control module issues transfer ready status to the host.
- (v) Data transferred from the host through switch to the drives (primary and mirror).
- (vi) Ending status sent from the drives to the control module.
- (vii) Ending status sent from the control module to the host.

Data read or write operations involving other RAID levels may also be carried out in a similar manner.

Referring now to FIG. 5, a computer system 50 with a fault-tolerant scalable performance storage architecture is illustrated. The exemplary arrangement of basic modules in FIGS. 3A–3E and 4A may be replicated to accomplish desired fault tolerance. In one embodiment, any data written into one of the caches 341 or 342 is automatically replicated into the other remaining cache. In the configuration of FIG. 5, a failure of one of the switches, control modules, caches or parity calculators may not affect data storage capability of the computer system 50. Redundancy may be increased further, if desired. The storage controllers in FIG. 5 are dual-ported. Especially, the switches 221 and 222 have sufficient number of ports to allow simultaneous access by the hosts 121 and 122. This arrangement not only improves reliability for data storage and retrieval, but also reduces latency in data transfers (for example, reduced latency in backing up the data into the storage devices 161 and 162). The switch hardware may be configured to include additional ports to accomplish desired level of redundancy and fault tolerance. The interconnect links in FIG. 5 may be fibre channels or SCSI buses or any other suitable interface architecture as earlier described with reference to FIGS. 3A–3E, 4A and 4B.

As mentioned earlier, all command, status and data transfers are routed through one or more of the switches. A switch properly configured to function under a given interface protocol may thus accomplish independence of data transfer and control functionality for its corresponding storage controller.

Some examples of performance scalability using independence in data transfer and control functionalities of a storage controller (as illustrated through FIGS. 3A–5) are: (1) To increase rate of execution of I/O operations (iops), more processing units (CPU's) may be added to the control module in the storage controller or more control modules may be added to the storage controller architecture (FIGS. 3D, 3E); (2) To increase data read bandwidth, the bandwidth of the data path connecting the host, the switch and the storage device may be increased without necessarily increasing the bandwidth of the control path linking the control module (FIG. 3C); (3) To increase bandwidth of RAID 5 writes to the storage, the bandwidth of the data path linking the storage device, the switch and the parity calculator may be increased; and (4) To increase bandwidth of data writes to the cache, the bandwidth of the data path connecting the host, the switch and the cache may be increased.

As described earlier, independent scalability of performance metrics (iops and data transfer bandwidth) under a typical two-party point-to-point interface protocol (e.g., the fibre channel protocol) may require a non-standard or modified switch (e.g., the switch 22 in FIGS. 3A–3E, 4A and 4B) to route the data. A standard fibre channel switch (for fibre channel protocol) or any other switch corresponding to the two-party protocol involved may, however, still be used to accomplish the same independence in storage performance scalability as described below with reference to FIGS. 6 and 7.

Figure 6:
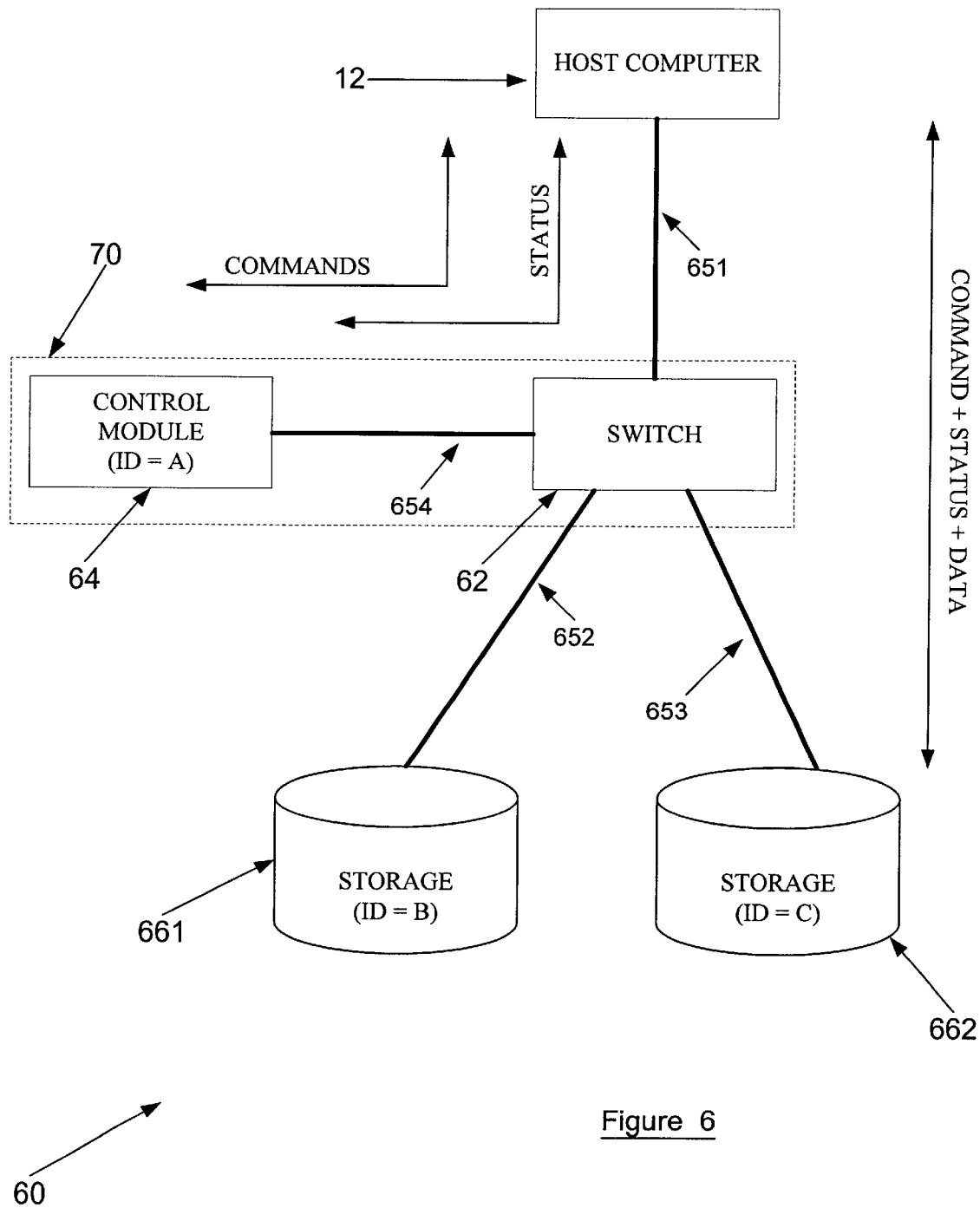
FIG. 6 shows an exemplary embodiment of a computer system where the storage controller employs a messaging scheme that facilitates data transfer to/from the host computer under a two-way point-to-point interconnect standard.

Referring now to FIG. 6, a computer system 60 implementing a modified messaging scheme to transfer data to/from the host computer 12 is shown. Although the computer system 60 is shown with two storage devices 661, 662 coupled to the switch 62, the discussion herein applies equally when there is only one storage device or, alternately, when there is more than two storage devices. Further, the storage controller 70 may include a modified control module 64 or a modified software driver to implement the illustrated messaging scheme. Additionally, the following discussion assumes that the interconnect links 651–654 are fibre channels. However, the messaging scheme disclosed herein may be implemented under any serial or parallel interface protocol.

In FIG. 6, the host computer 12 sends read or write commands to the control module 64 as usual. The control module 64 decodes the received command and translates it into one or more commands according to the data transfer request from the host and according to the RAID configuration, if applicable. However, instead of issuing these translated commands to the storage device 661 and/or 662 (in a way similar to that shown, for example, in FIGS. 3A–3E, 4A and 4B), the control module 64 sends those translated commands to the host 12. The host adapter card (not shown) may receive this list of commands from the control module 64 via the switch 62. The software driver for the host adapter card may then issue this new set of commands to the storage device 661 and/or 662.

Thus, the net effect of such messaging is that the data transfer commands (after translation by the control module 64) appear to have been issued directly from the host 12 to the storage device 661 and/or 662 via the switch 62. The storage device 661 and/or 662 thus responds by performing the transfer of data to/from the host 12 as indicated by the data transfer commands from the host. In case of a data write operation, for example, the data would be stored in the same location in one or more storage devices had the command been sent by the control module (for example, in a way similar to that shown in FIGS. 3A–3E, 4A and 4B) instead of the host computer sending the translated set of commands. The data transfer mechanism is therefore substantially simplified, especially in view of two-party interface protocols, such as the fibre channel protocol. Further, since the switch does not need to modify transfers to account for a third party, a standard controller switch (for example, switch 62) may be conveniently used.

Figure 1:
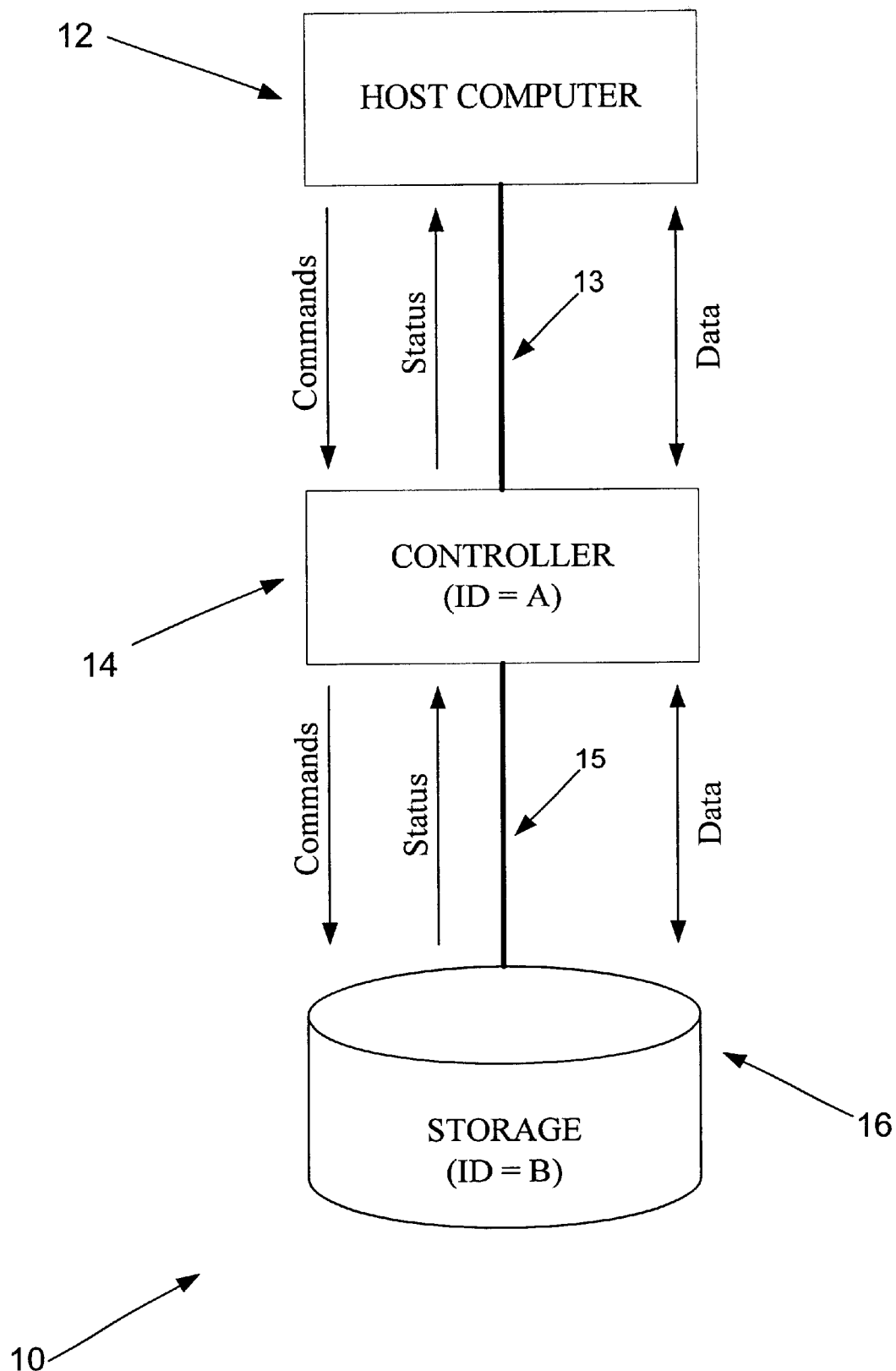
FIG. 1 shows a conventional storage controller with the flow of various control and data packets therethrough.

The data transfer through a conventional storage controller was described with reference to FIGS. 1 and 2. The present data transfer mechanism in FIG. 6 accomplishes independent scalability of storage controller performance metrics (iops and data transfer bandwidth) without passing every command, status and data information through the conventional controller as in FIG. 1. There are two separate transactions illustrated in FIG. 6: (1) Command and status information flowing between the host 12 and the control module 64 via the switch 62 and over the control path identified by the links 651 and 654; and (2) Command, status and data flowing directly between the host 12 and the storage device 661 via the switch 62 and over the control and data paths embodied in the links 651 and 652 and/or 653. As previously mentioned, the control and data paths in the interconnect links 651, 652 and 653 may be physically separate or may be shared. However, a shared nature of control and data paths does not affect the independence in scalability of performance metrics because of separation of the storage controller's 70 control-related functions (i.e., transfer of command and status packets) from its data transfer bandwidth.

In one embodiment, the storage controller 70 further includes other modules, e.g., the parity logic or the cache memory (as shown, for example, in FIG. 4A). The control module 64 transmits appropriate routing information to the switch 62 along with the set of translated data transfer commands to be forwarded to the host 12. The host 12 eventually issues all data transfer commands, and based on the routing information the switch 62 may route the data to the cache memory or to the parity logic (for parity calculation) or directly to the appropriate storage device as indicated by the data transfer command coming from the host 12. The data is thus still transferred between the host 12 and one or more storage devices independently of the control functionality of the control module 64. Independence in performance scalability is thus maintained in case of data transfers under a two-party interface protocol, e.g., the fibre channel protocol.

Figure 7:
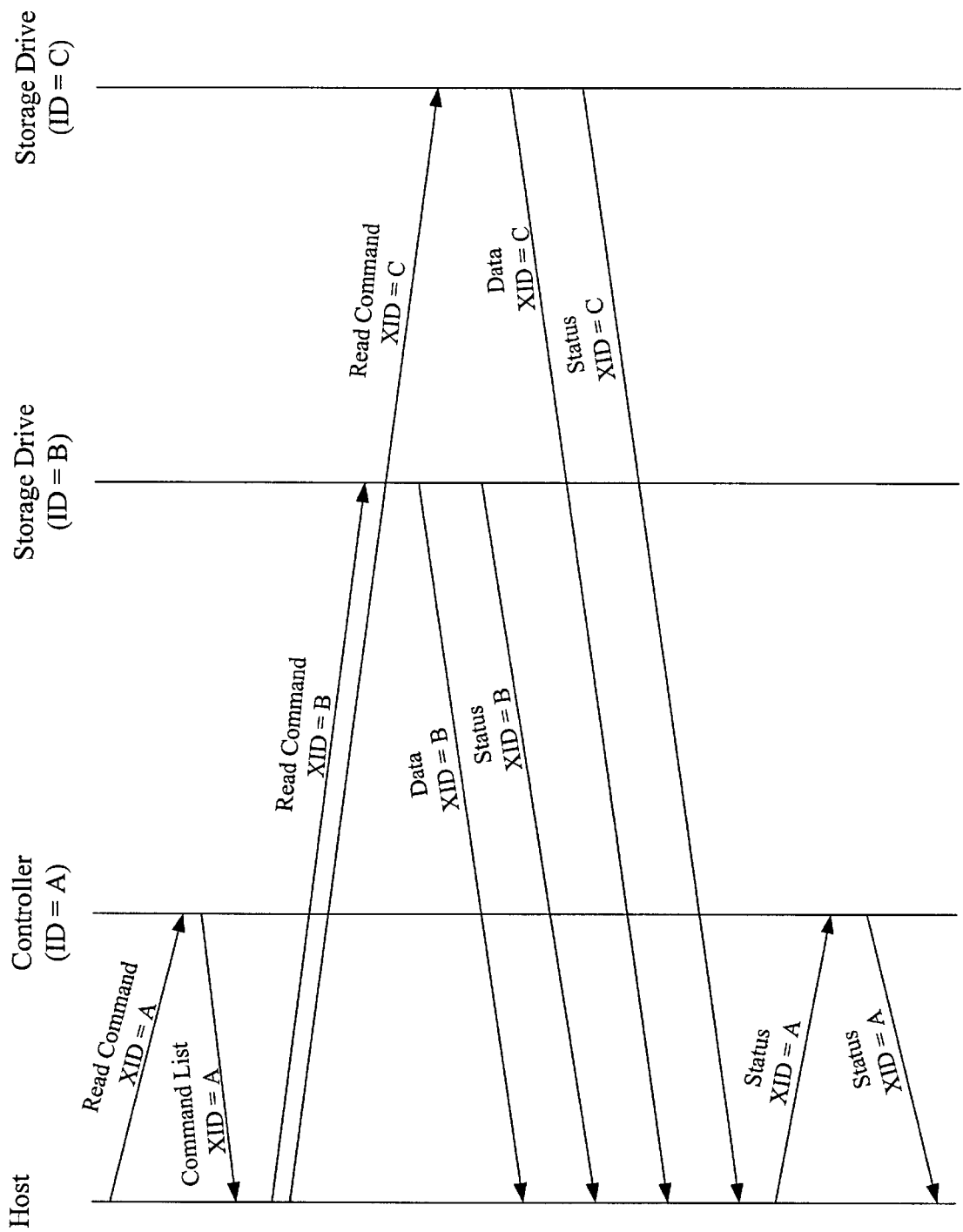
FIG. 7 is an exemplary flow diagram of control and data packets during a read operation initiated by the host computer in the system architecture of FIG. 6.

Referring now to FIG. 7, an exemplary flow of control information (i.e., command and status information) and data information during a read operation initiated by the host computer 12 in the system architecture of FIG. 6 is illustrated. The host 12 issues the read command to the control module 64 identifying the control module as its intended recipient (XID=A). The control module 64 decodes the received command as a data read command and translates the read command depending on the type of the read command (from the host) and depending on the nature of the data read. Relevant parity and/or cache storage information may also be transmitted to the host as part of the list of translated commands.

Here, the control module 64 determines that the read command from the host requires data from both of the storage devices, 661 and 662. Therefore, the control module 64 sends appropriate decoded data read commands to the host identifying the storage devices to be accessed for the required data. During the next step of the data read operation, the host software driver in conjunction with the host adapter card issues appropriate data read commands (received as part of the list of translated commands from the control module) directly to storage device 661 (XID=B) and also to the device 662 (XD=C). As the storage devices or storage drives, whatever the case may be, receive corresponding data read commands directly from the host, they transfer the requested data and status information directly to the host 12 via the switch 62. The host 12 receives the status information from both of the storage devices, 661 and 662, and forwards that information to the control module 64 (XID=A), which, in response, sends a final status packet to the host indicating the control module 64 as the originator of the status packet (XID=A). The control module 64 may process the forwarded status information prior to responding with the final status packet. In one embodiment, the host 12 (through the host adapter card) may fully or partially process the status information received from the storage devices, 661 and 662, and may then transmit the processed status information to the control module 64, which, in turn, may respond with appropriate data transfer status recognition signal. A status packet from the control module 64 to the host 12 may function to indicate completion of the sequence of control and data transfer operations initiated by the data read command from the host 12 to the control module 64.

Figure 2:
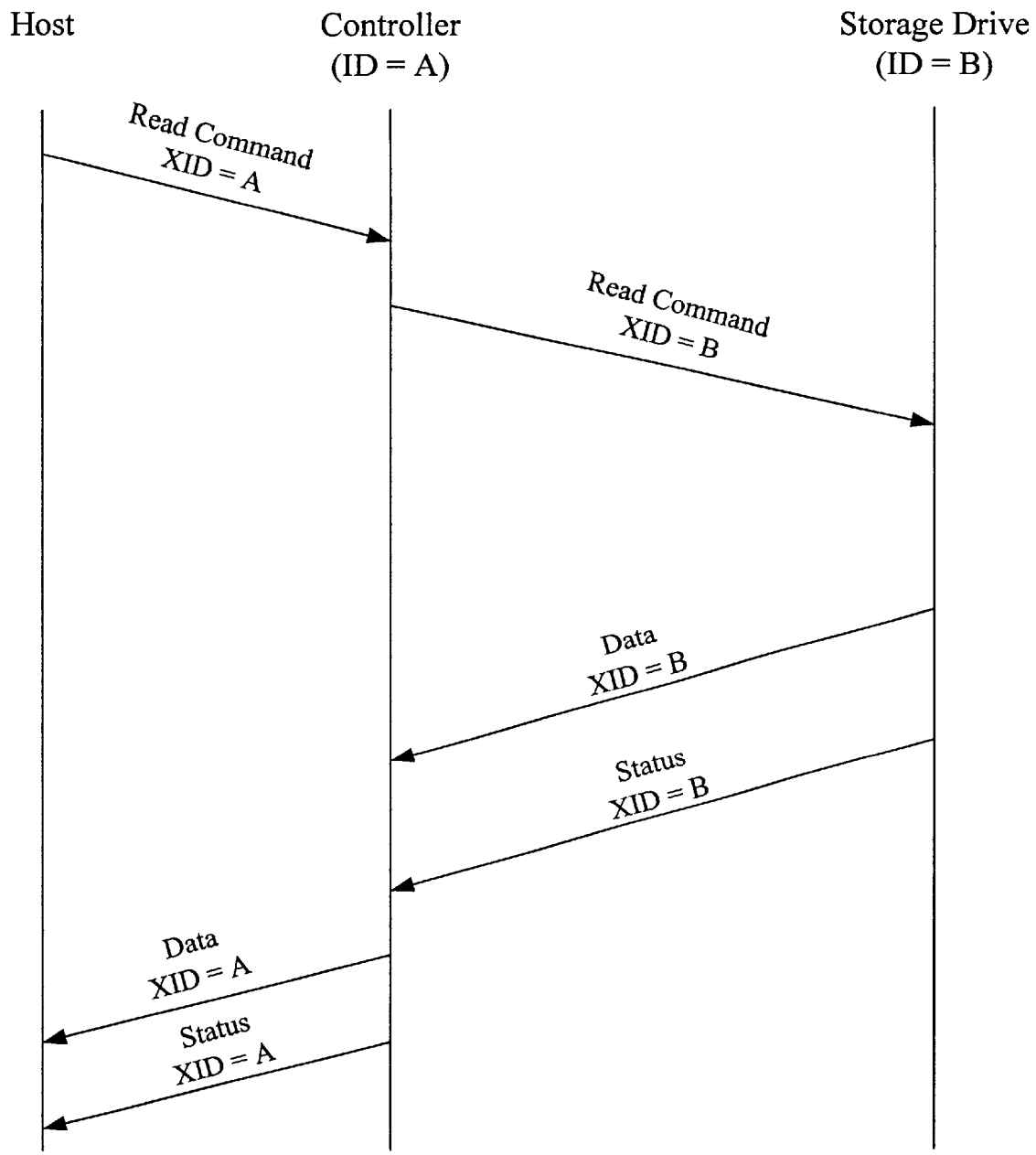
FIG. 2 is an exemplary flow diagram of control and data packets during a read operation initiated by the host computer in FIG. 1. The host to controller and the controller to storage device links are point-to-point interconnects implementing a two-party data transfer protocol.

It is noted that the foregoing messaging sequence differs from that shown in FIG. 2 and also from the one describes with reference to FIGS. 3A–3E, 4A and 4B. However, the present messaging scheme (as shown by way of examples in FIGS. 6 and 7) accomplishes the same result as is achieved by the storage architectures in FIGS. 3A–3E, 4A and 4B—i.e., independent scalability of storage performance metrics—without any necessity to modify the standard storage controller switch (for example, the switch 62 in FIG. 6) depending on the interface protocol. This is especially useful, for example, in case of a two-party interface protocol (e.g., the fibre channel protocol) where it may be desirable to maintain the existing standard switch architecture and still have independent scalability of performance storage metrics (iops and data transfer bandwidth).

The foregoing discloses various systems and methods to accomplish independent scalability of a storage controller performance metrics—i.e., rate of execution of I/O operations (iops) and data transfer bandwidth. This allows very high bandwidth systems to be constructed with minimal data transfer latency. The restricted scalability of current data storage systems due to the storage controllers having relatively inflexible ratio of CPU (for iops) to bandwidth capability has been addressed. More flexible storage controller and computer system architectures may thus be designed without unnecessary, and sometimes expensive, storage system scaling operations. While the exemplary drawings (FIGS. 3A–6) illustrate one or two storage devices, it is understood that the present invention is not restricted to the number of storage devices or physical drives within a storage device. Similarly, the level of fault-tolerance built into the system need not affect implementation of the present invention.

While the invention is susceptible of various modifications and alternative forms, specific embodiments thereof are shown by way of examples in the drawings and are herein described in detail. It should be understood, however, that the drawings and detailed descriptions thereto are not intended to limit the invention to the particular forms disclosed, but, on the contrary, the intention is to cover all such modifications, equivalents and alternatives as falling within the spirit and scope of the present invention as defined by the appended claims.

What is claimed is:

1. In a computer system having a host computer, a storage device, and a storage controller, a method of transferring data between said host computer and said storage device, the method comprising:
    said host computer transmitting a first data transfer command to said storage controller;
    said storage controller translating said first data transfer command into a second data transfer command;
    said storage controller transmitting said second data transfer command to said host computer; and
    said host computer directly transmitting said second data transfer command to said storage device, thereby initiating transfer of said data between said host computer and said storage device.

2. The method as recited in claim 1, wherein said storage controller includes a switch linking said host computer and said storage device, and a control module coupled to said switch.

3. The method according to claim 2, further comprising transferring said data between said host computer and said storage device via said switch in response to said second data transfer command from said host computer without passing said data through said control module.

4. The method as in claim 2, wherein said storage controller translating said first data transfer command includes generating said second data transfer command based on data transfer operation indicated by said first data transfer command and on a RAID (Redundant Array of Independent Disks) level implemented by said control module in view of said data transfer operation.

5. The method of claim 4, wherein said second data transfer command includes a plurality of data transfer commands.

6. The method as recited in claim 4, wherein said storage controller transmitting said second data transfer command includes transmitting said second data transfer command with information pertaining to said RAID level implemented by said control module.

7. The method according to claim 3, wherein said transferring said data between said host computer and said storage device includes storing said data into said storage device along with corresponding parity information when said first data transfer command indicates a data write operation.

8. The method of claim 3, further comprising said storage device transmitting first status information to said host computer via said switch upon completion of said transferring said data between said host computer and said storage device.

9. The method as in claim 8, further comprising said host computer transmitting second status information to said control module via said switch upon receiving said first status information.

10. The method of claim 9, further comprising said control module transmitting third status information to said host computer via said switch after receiving said second status information.

11. A computer system comprising:
    a host computer;
    a storage device configured to receive and store data from said host computer and to convey said data to said host computer when requested by said host computer; and
    a storage controller coupled to said host computer and said storage device to manage transfer of said data between said host computer and said storage device, wherein said storage controller includes:
        a switch, wherein said switch links said host computer and said storage device via a control path and a data path, wherein said host computer requests said transfer of said data to/from said storage device by transmitting a first command over said control path; and
        a control module coupled to said switch via said control path, wherein said control module is configured to receive said first command via said switch and to responsively transmit via said switch and over said control path a second command to said host computer; and
    wherein said host computer is configured to directly transmit said second command to said storage device via said switch and over said control path to initiate said transfer of said data over said data path.

12. The computer system of claim 11, wherein said data path is physically separate from said control path.

13. The computer system of claim 11, wherein said switch has a plurality of ports.

14. The computer system as in claim 11, wherein said control path includes:
    a first control path linking said host computer and said switch;
    a second control path linking said control module and said switch, wherein said first command is transmitted over said first and said second control paths, and wherein said second command from said control module to said host computer is sent over said first and said second control paths; and
    a third control path linking said switch and said storage device, wherein said second command from said host computer to said storage device is transmitted over said first and said third control paths.

15. The computer system of claim 11, wherein said data path includes:
    a first data path linking said host computer and said switch; and
    a second data path linking said switch and said storage device, wherein said transfer of said data is over said first and said second data paths.

16. The computer system according to claim 11, wherein said storage device includes a disk drive array to store said data from said host computer in a fault-tolerant configuration.

17. The computer system as recited in claim 16, wherein said fault-tolerant configuration implements at least one RAID (Redundant Array of Independent Disks) level for storing said data within said disk drive array.

18. The computer system of claim 11, wherein said host computer includes:
- a host adapter card; and
- a software driver for said host adapter card, wherein said software driver configures said host adapter card to directly transmit said second command to said storage device via said switch.

19. The computer system as in claim 11, wherein said second command includes a plurality of commands depending on a data read or a data write operation specified by said first command and on a RAID level implemented by said control module for said transfer of said data.

20. The computer system according to claim 11, wherein said second command from said control module to said host computer includes parity information for said transfer of said data.

21. In a computer system having a host computer, a first storage device, a second storage device, and a storage controller including:
- a switch linking said host computer with said first and said second storage devices, and
- a control module coupled to said switch, a method of transferring a first data packet between said host computer and said first storage device and a second data packet between said host computer and said second storage device, the method comprising:
  - said host computer transmitting first data transfer command via said switch identifying said control module as a recipient of said first data transfer command;
  - said control module translating said first data transfer command into a plurality of second data transfer commands, wherein a first one of said plurality of second data transfer commands identifies said first storage device as the recipient thereof, and wherein a second one of said plurality of second data transfer commands identifies said second storage device as the recipient thereof;
  - said control module transmitting said plurality of second data transfer commands to said host computer via said switch, wherein said plurality of second data transfer commands identifies said control module as an originator thereof;
  - said host computer conveying said plurality of second data transfer commands to said switch; and
  - said switch directly forwarding said first and said second ones of said plurality of second data transfer commands to said first and said second storage devices respectively, thereby initiating respective transfers of said first and said second data packets.

22. The method as in claim 21, further comprising:
transferring said first data packet directly between said first storage device and said host computer via said switch in response to said first one of said plurality of second data transfer commands; and
further transferring said second data packet directly between said second storage device and said host computer via said switch in response to said second one of said plurality of second data transfer commands.

23. The method according to claim 22, further comprising:
transmitting first status packet from said first storage device to said host computer indicating status of said transfer of said first data packet, wherein said first status packet identifies said first storage device as said originator thereof; and
further transmitting second status packet from said second storage device to said host computer indicating status of said transfer of said second data packet, wherein said second status packet identifies said second storage device as said originator thereof.

24. The method of claim 23, further comprising said host computer transmitting via said switch a third status packet that identifies said control module as said recipient thereof, wherein said third status packet conveys status information contained in said first and said second status packets.

25. The method as recited in claim 24, further comprising said control module transmitting a fourth status packet to said host computer via said switch, wherein said fourth status packet is transmitted in response to said third status packet and identifies said control module as said originator thereof, and wherein said fourth status packet indicates completion status of said transfers of said first and said second data packets.

26. A storage controller to manage transfer of data between a host computer and a storage device, said storage controller comprising:
- a switch configured to link said host computer and said storage device; and
- a control module coupled to said switch, wherein said control module is configured to receive through said switch a first data transfer command from said host computer, wherein said control module is further configured to translate said first data transfer command into a second data transfer command and to send said second data transfer command to said host computer via said switch;
  - wherein said switch is configured to convey said second data transfer command directly from said host computer to said storage device to allow said transfer of said data in response to said second data transfer command.

27. The storage controller of claim 26, wherein said control module includes:
- at least one processor to process said first data transfer command and to generate said second data transfer command; and
- interface logic for coupling of said control module and said switch.

28. The storage controller as in claim 27, wherein said control module further includes drive selection logic to transmit drive selection information to said host computer as part of said second data transfer command, thereby allowing a data read or a data write transaction involving a plurality of disk drives in said storage device.

29. The storage controller according to claim 26, further comprising:
- a parity calculator coupled to said switch to perform parity calculation during said transfer of said data;
- wherein said control module is configured to transmit parity calculation information to said host computer as part of said second data transfer command.

30. The storage controller of claim 26, further comprising a memory module coupled to said switch, wherein said memory module includes:
- a cache memory for selective temporary storage of said data during said transfer of said data between said host computer and said storage device; and
- a cache controller to manage said selective temporary storage of said data into said cache memory, wherein said control module is configured to transmit caching information to said host computer as part of said second data transfer command.

31. The storage controller as recited in claim 26, wherein said switch links said host computer and said storage device via a fibre channel.

32. The storage controller according to claim 26, wherein said switch is configured to forward status information from said storage device directly to said host computer, wherein said status information indicates completion status of said transfer of said data.

33. The storage controller as in claim 26, wherein said control module is configured to receive first status information from said host computer via said switch and responsively transmit second status information to said host computer via said switch, wherein said second status information indicates completion status of said transfer of said data.

* * * * *